United States Patent

Qian et al.

[19]

[11] Patent Number: 6,002,803
[45] Date of Patent: Dec. 14, 1999

[54] METHODS OF CODING THE ORDER INFORMATION FOR MULTIPLE-LAYER VERTICES

[75] Inventors: Richard J. Qian, Vancouver; M. Ibrahim Sezan, Camas, both of Wash.

[73] Assignee: Sharp Laboratories of America, Inc., Camas, Wash.

[21] Appl. No.: 08/916,972

[22] Filed: Aug. 19, 1997

Related U.S. Application Data

[63] Continuation-in-part of application No. 08/825,646, Apr. 3, 1997, Pat. No. 5,838,830
[60] Provisional application No. 60/040,178, Mar. 11, 1997.
[51] Int. Cl.$^6$ .................................................. G06K 9/48
[52] U.S. Cl. .................... 382/242; 382/240; 345/440; 395/500
[58] Field of Search ............................... 382/242, 243, 382/240; 395/500; 345/440

[56] References Cited

U.S. PATENT DOCUMENTS

| | | | |
|---|---|---|---|
| 5,634,113 | 5/1997 | Rusterholz ............................... | 395/500 |
| 5,764,808 | 6/1998 | O'Connell et al. ...................... | 382/242 |
| 5,825,369 | 10/1998 | Rossignac et al. ...................... | 345/440 |

OTHER PUBLICATIONS

Abuhaiba et al., "Processing of Binary Images of Handwritten Text Documents", Elsevier Science Ltd., Pattern Recognition, vol. 29, No. 7, pp. 1161–1177, 1966.
Horace IP et al., "Three Dimensional Structural Texture Modeling and Segmentation", Elsevier Science Ltd., Pattern Recognition, vol. 28, No. 9, pp. 1299–1319, Feb. 1995.

*Primary Examiner*—Jose L. Couso
*Assistant Examiner*—Anh Hong Do
*Attorney, Agent, or Firm*—Robert D. Varitz, PC

[57] ABSTRACT

A method for coding multiple layer, vertex-based shape representation and bit stream scalable shape includes selecting vertices in a hierarchical scheme; defining multiple layers of vertices; arranging M layers of vertices in order, from the most salient layer to the least salient layer; placing vertices in their natural order along their image contour within each layer; storing vertices from each layer separately; and recording vertex order information for each vertex in each layer of vertices. Four variations of the method for multiple layer vertex representation and coding are disclosed where the correct order information is coded for correct reconstruction of the shape information.

7 Claims, 5 Drawing Sheets

EXAMPLE VERTEX LIST (M = 3):  ○××○△×△○△△×○△△○  ↵ 66

LAYER 0    ○○○○○  ↵ 68

LAYER 1    ××××  ↵ 70

LAYER 2    △△△△△△  ↵ 72

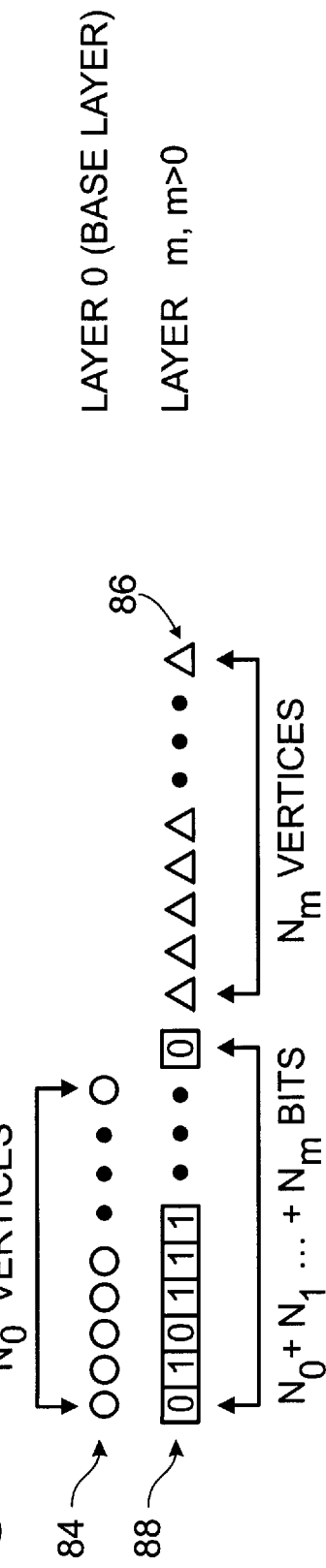

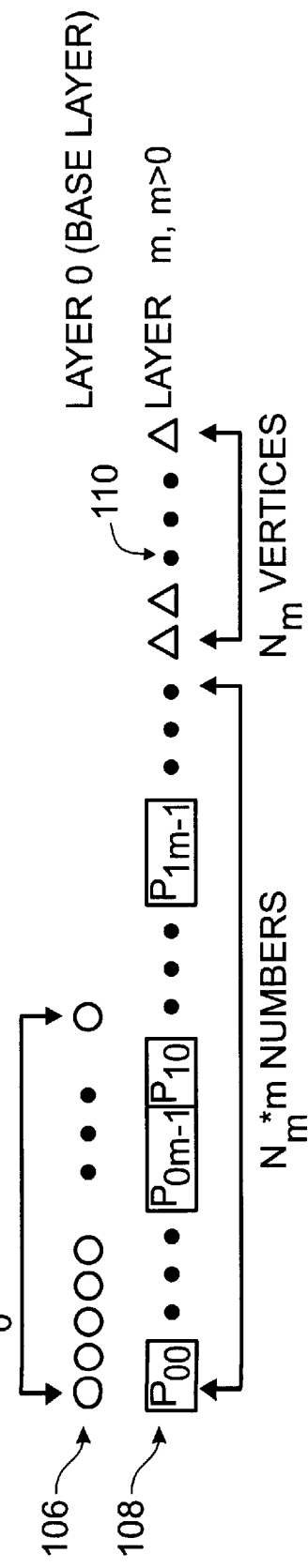
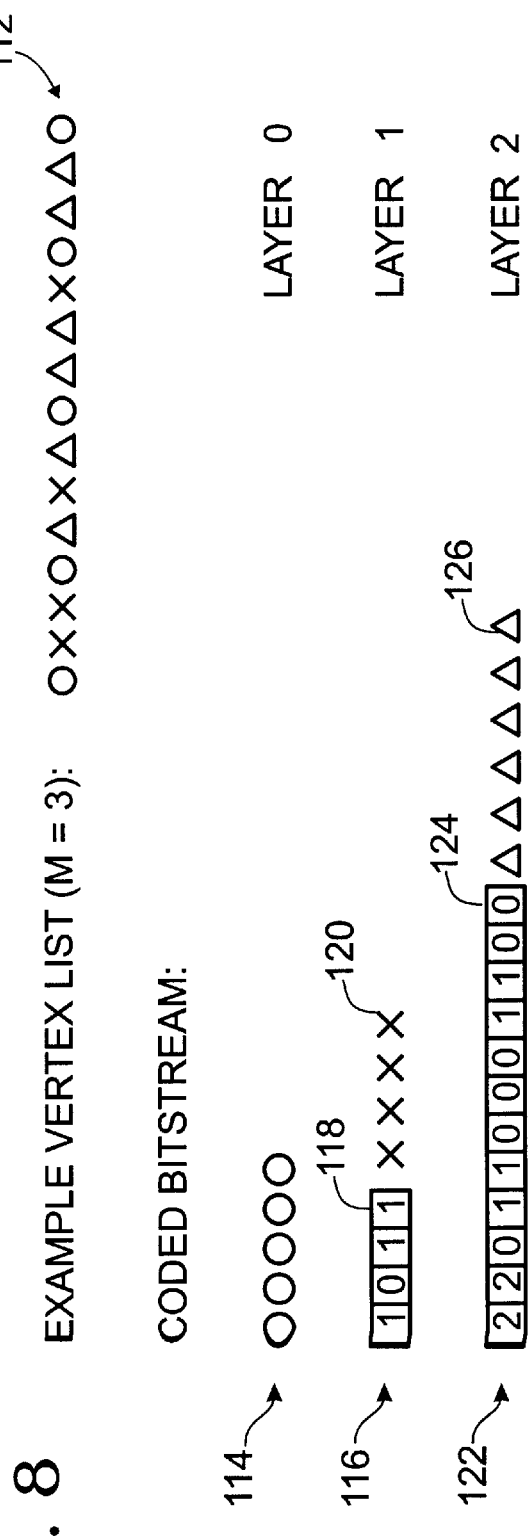
Fig. 7
Fig. 8

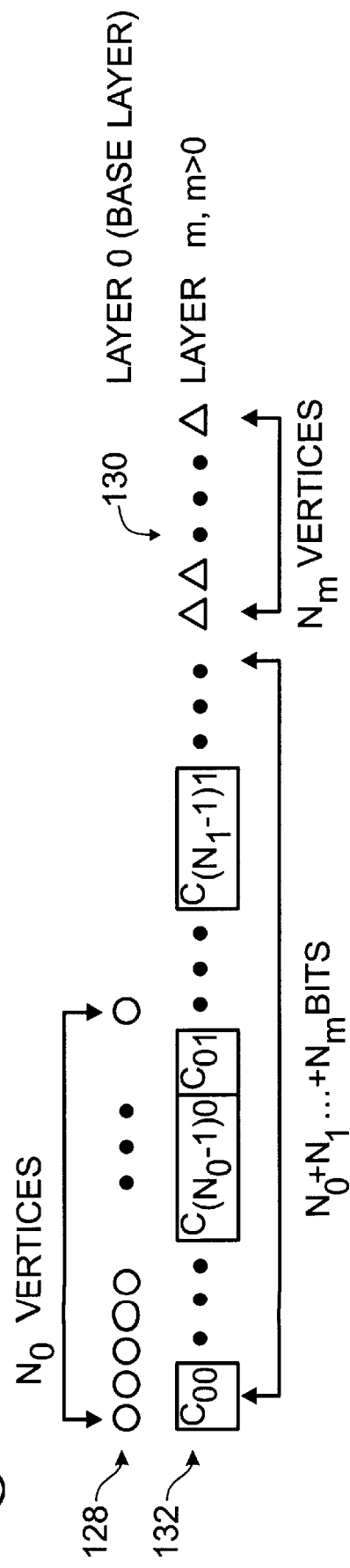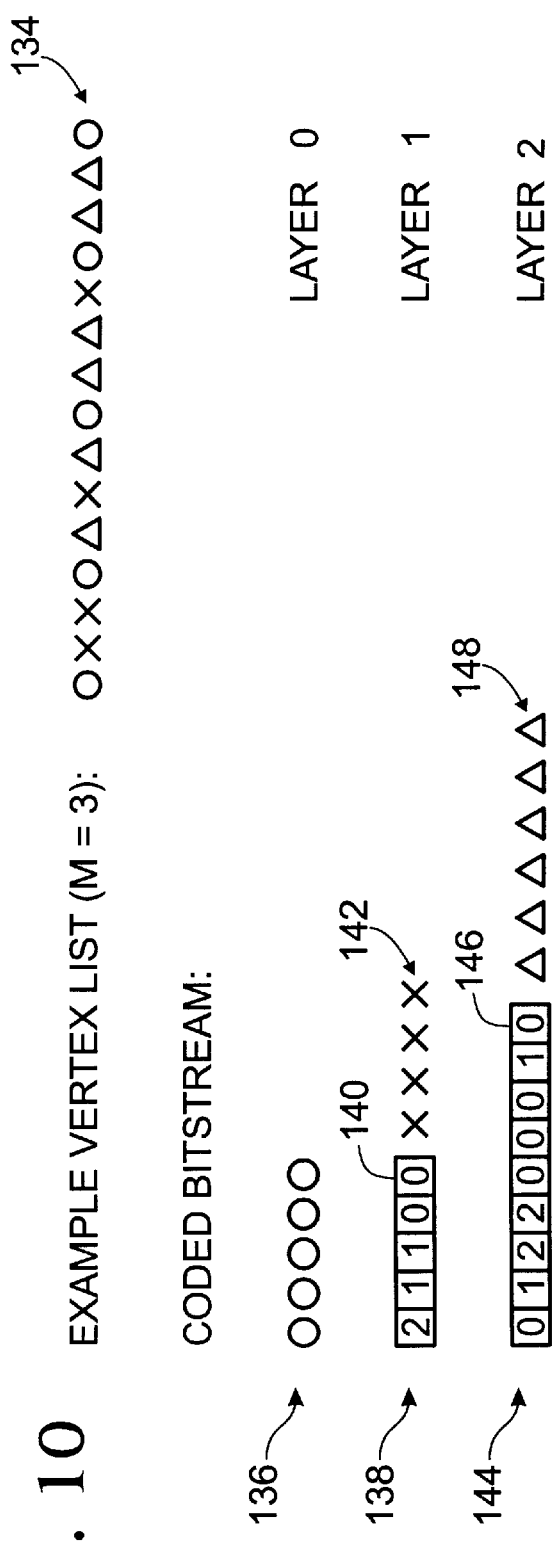

METHODS OF CODING THE ORDER INFORMATION FOR MULTIPLE-LAYER VERTICES

RELATED APPLICATION

This is a continuation-in-part of U.S. patent application Ser. No. 08/825,646, filed Apr. 3, 1997, for "Vertex-Based Hierarchical Shape Representation and Coding Method and Apparatus," now U.S. Pat. No. 5,838,830, granted Nov. 17, 1998, and provisional application No. 60/040,178, filed on Mar. 11, 1997.

FIELD OF THE INVENTION

This invention is concerned with a multiple layer, vertex-based shape representation method and its application to bit stream scaleable shape coding in an object based image or video coding framework, such as Moving Pictures Expert Group standards, and specifically for the MPEG-4 and subsequent standards.

BACKGROUND OF THE INVENTION

Content based coding and manipulation is one of the core functionalities supported by the emerging MPEG standards. This functionality requires representation and coding of arbitrarily shaped image objects, where the coding problem may be separated into texture and shape (contour) coding.

Multiple layer shape representation is important in the context of object-based image and video coding since it facilitates bit stream scaleable shape coding, where the coded bit streams belonging to different hierarchy layers are separated. If the channel is severely band-limited, only the bit stream belonging to the base layer may be transmitted. Additional layers are transmitted when the channel bandwidth is sufficient. Bit stream scalability is therefore rather important for channels with non-guaranteed bandwidth such as the Internet.

In cases where the entire shape information may be transmitted or stored, bit stream scalability enables the decoder (i) to decode a certain number of layers to meet its computational and display requirements, or (ii) perform a fast decode, using only the base layer, for instance in applications that require low-delay, fast browsing of an image and video database. The decoder may progressively decode and reconstruct the shape information.

Bit stream scalability requires that vertices belonging to different layers are stored separately so that reconstruction of a shape may be performed using only the vertices belonging to a certain selected layer and the previous layers. One of the problems associated with multiple layer, vertex-based shape representation is the problem of preserving the order information of the vertices so that the shape may be reconstructed without ambiguity when all the vertices are not available in their natural order in a single list.

SUMMARY OF THE INVENTION

The method of the invention for coding multiple layer, vertex-based shape representation and bit stream scalable shape, includes selecting vertices in a hierarchical scheme; defining multiple layers of vertices; arranging M layers of vertices in order, from the most salient layer to the least salient layer; placing vertices in their natural order along their image contour within each layer; storing vertices from each layer separately; and recording vertex order information for each vertex in each layer of vertices. The focus of this invention is on object shape representation and coding. Four variations of the method for multiple layer vertex representation and coding are disclosed where the correct order information is coded for correct reconstruction of the shape information.

It is an object of the invention to remove any order ambiguity in decoding.

Another object of the invention is to provide a method for multiple layer shape representation that is based on a hierarchical set of vertices.

A further object of the invention is to use the minimum bit consumption for storing the order information.

Another object of the invention is to provide truly scaleable bit streams.

Yet another object of the invention is to facilitate low computational cost to recover the order information.

These and other objects and advantages of the invention will become more fully apparent as the description which follows is read in connection with the drawings.

BRIEF DESCRIPTION OF THE DRAWINGS

FIG. 5 is a representation of a first embodiment of the invention.

FIG. 6 is an example of multiple layer vertex coding using the method of the first embodiment of the invention.

FIG. 7 is a representation of a second embodiment of the invention.

FIG. 8 is an example of multiple layer vertex coding using the method of the second embodiment of the invention.

FIG. 9 is a representation of a third embodiment of the invention.

FIG. 10 is an example of multiple layer vertex coding using the method of the third embodiment of the invention.

DETAILED DESCRIPTION OF THE EMBODIMENTS OF THE INVENTION

Figure 1:
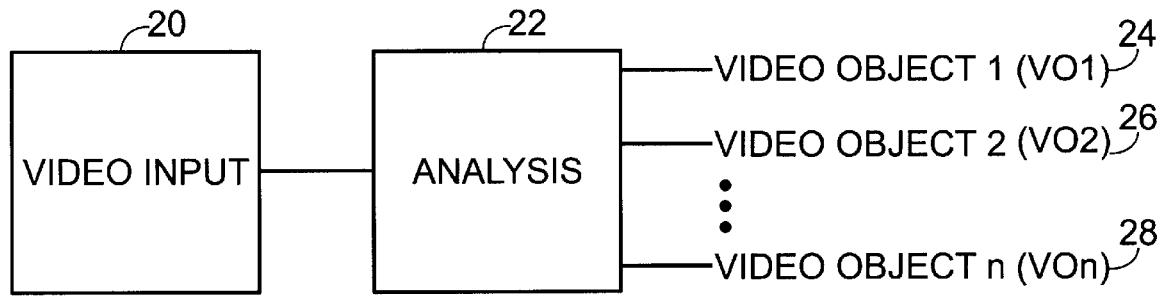
FIG. 1 is a block diagram of a video analysis of a video input into video objects.

Referring now to FIG. 1, in object-based video coding, input video 20 is analyzed, block 22, into different video objects, VO1 (24), VO2 (26), and VOn (28), whose composition make up a video sequence. Video objects are described by their shape, their texture, and their motion trajectories. Video objects are coded by coding the representations of these three features.

Figure 2:
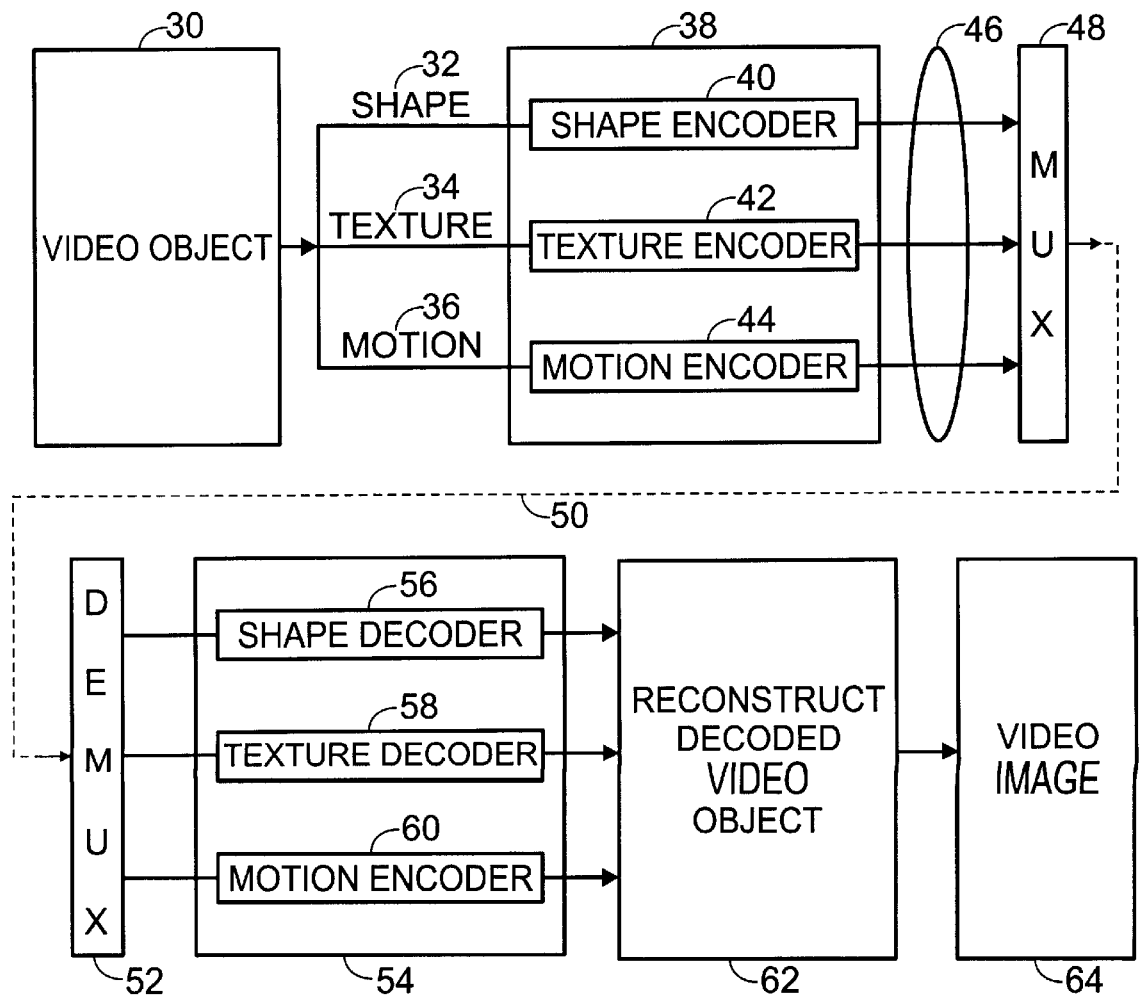
FIG. 2 is a block diagram of the components of an object-based video encoder/decoder to facilitate the method of the invention.

Major components of an object-based video encoder and decoder are depicted in FIG. 2. As previously noted, video input 20 is analyzed into video objects (VO). Each VO, collectively represented by video object 30, is defined by its shape component, 32, its texture component, 34, and its motion component, 36. An encoder mechanism 38 includes a shape encoder 40, which encodes a particular representation of the shape, e.g., a vertex-based representation. A texture encoder 42 encodes a representation of the color or texture of the VO while a motion encoder 44 encodes a representation of the motion of the VO. In a bit stream generated by a shape encoder, the vertices belonging to different hierarchical layers are included into a single bit stream, and are encoded together. Alternately, the vertices in each layer may be included in discrete bit streams, wherein each hierarchical layer is separately encoded. In the case where different sets corresponding to different hierarchical layers are placed in discrete bit streams, a set of vertices of a selected layer may be predictively coded using vertices from a coarser layer.

Signals 46, representative of the encoded shape, texture and motion, are transmitted to a multiplexer 48, retransmitted in a transmission mechanism 50 of an appropriate type to a demultiplexer 52, and then to a decoder 54. Decoder 54 includes a specific shape decoder 56, a texture decoder 58, and a motion decoder 60. The VOs are reformed into a video image by a reconstruction mechanism 62, and output as a video image by video output 64. It should be appreciated that once the signals are encoded, they may be transmitted to multiplexer 48, or they may be stored in a database in place of, or in addition to, multiplexer 48, for future use, such as providing fast browsing of images in a database. The stored signals may be reconstructed into images at a later time. Our focus in this invention is on object shape representation and coding.

The object shape at a particular time instant in the video sequence is represented by vertices on the shape contour. The vertices may be selected from all the points obtained as a result of contour tracing applied to a binary shape map (unless the contour points are readily available). In this invention, a hierarchical selection method is used where vertices at different hierarchy layers are chosen. The base layer (layer 0) contains the fewest number of vertices that are the most significant in describing the shape. Each subsequent layer adds an additional set of vertices that are less significant. The hierarchical vertex selection method, where hierarchy is defined in terms of visual saliency of vertices, is discussed in our previously filed patent application for VERTEX-BASED HIERARCHICAL SHAPE REPRESENTATION AND CODING METHOD AND APPARATUS, Ser. No. 08/825,646, filed Apr. 3, 1997. Other hierarchical methods, such as an extension of the iterative refinement method, may also be utilized.

Figures 3, 4:
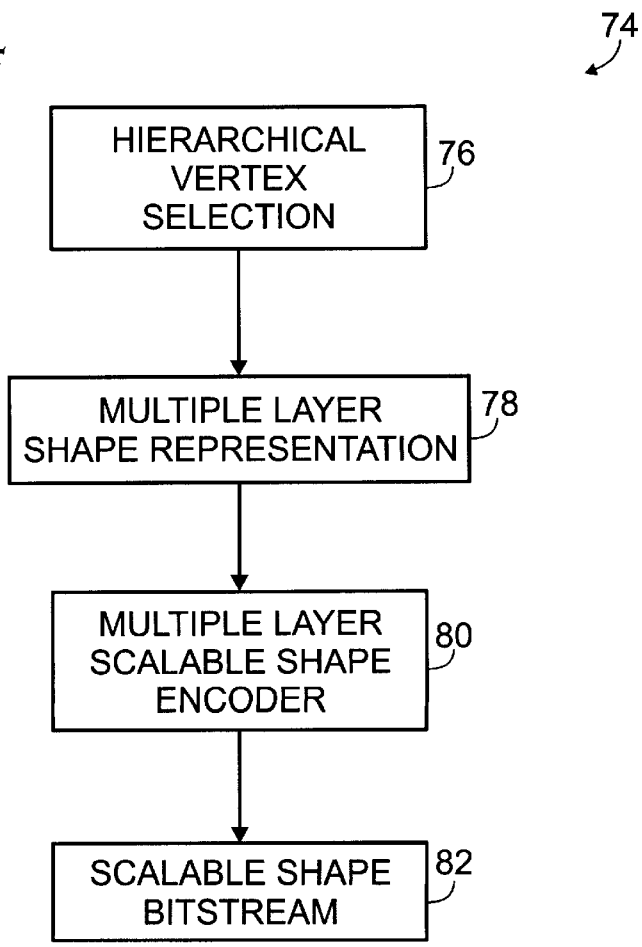
FIG. 3 is a schematic representation of a one-dimensional vertex list and a multi-layer hierarchical vertex scheme.
FIG. 4 is a block diagram of the steps of the method of the invention.

Bit stream scalability requires that vertices belonging to different layers are stored separately so that reconstruction of a shape may be performed using only the vertices belonging to a certain selected layer and the previous layers. One of the problems associated with multiple layer, vertex-based shape representation is the problem of preserving the order information of the vertices so that the shape may be reconstructed without ambiguity when all the vertices are not available in their natural order in a single list. Referring now to FIG. 3, this ambiguity problem will be explained. The top part of FIG. 3 depicts a vertex list 66 where vertices from three hierarchy layers are listed in a single list in their natural order. The vertices are taken from three layers identified as layer 0, 68, layer 1, 70, and layer 2, 72. If vertices are listed and coded in their natural order, there is no ambiguity problem. In a multiple layer representation, where the vertices are separated into multiple layers, as shown at 68, 70 and 72, the decoder must know the order in which the higher layer vertices should be placed relative to the lower layer vertices.

An object of this invention is to provide a method for coding the order information for multiple layer vertices, and several variations thereof. In multiple layer shape representation, vertices belonging to different hierarchy layers are stored separately. Also, reconstruction of shape at a certain layer (m≧0) is performed progressively using only the vertices belonging to that layer and the previous layers (m−1, . . . , 0).

It should be noted that spatial scalability and quality scalability, as disclosed in our prior patent application, cited above, and content scalability, as cited in another co-pending patent application for METHOD OF GENERALIZED CONTENT-SCALABLE SHAPE REPRESENTATION AND CODING, Ser. No. 08/856,387, filed May 14, 1997, may be implemented in a bit stream scaleable way using one of the multiple layer shape representation and coding methods proposed in this invention.

General Method of the Invention

When designing a method of coding the order information for multiple layer vertices, there are two major objectives: 1) remove any order ambiguity in decoding; and 2) use the minimum bit consumption for storing the order information. Other objectives include: 1) providing truly scaleable bit streams; and 2) facilitating low computational cost to recover the order information.

Major steps of bit stream scaleable shape coding of the method 74 are depicted in FIG. 4. The steps include (1) hierarchical vertex selection, 76, which includes selecting vertices in a hierarchical scheme; (2) multiple layer shape representation 78, which defines multiple layers of vertices arranged in order from most salient to least salient, and which places the vertices in their natural order along their image contour within each layer; (3) multiple layer scalable shape encoding, 80, which encodes vertices and vertex order information in a bit stream scalable manner, encoding vertex order information using one of the variations described below; and (4) scalable shape bit stream generation, 82. Decoding is a reverse process of the encoding process.

The following material discloses four variations of the method of the invention, all of which may recover the order information precisely, i.e., no order ambiguity. The variations differ in terms of bit consumption, degree of bit stream scalability and computation cost. All four variations assume that in a bit stream, vertices from different layers are placed separately, i.e., layer-by-layer from the most salient layer to the least salient layer. Within each layer, vertices are placed in their natural order along the contour which they represent.

The First Embodiment

Referring now to FIGS. 5 and 6, assume there are M layers of vertices, where M>0, and there are $N_0, N_1, \ldots, N_{(M-1)}$ vertices in Layers 0, 1, . . . , and (M−1), respectively. This embodiment records vertex order information at the beginning of each layer, except in the base layer, i.e., Layer 0. In this way, a decoder that needs to decode only the base layer does not have to deal with the overhead of the order information. For any given Layer m, m>0, the order information is specified by a binary list that allocates 1 bit for each vertex in the current and previous layers, (m, m−1, . . . 0). In the binary list, a "0" is stored if the corresponding vertex is from the previous layers and an "1" is stored if the vertex is from the current layer. In FIG. 5, layer 0, 84, includes vertices represented by circles; triangles represent vertices in layer m, 86. A binary vertex order list 88 represents the order information for $N_0+N_1+\ldots+N_{(m)}$ vertices in layers 0, 1 . . . (m).

Referring now to FIG. 6, a three layer vertex list is shown at 90. Layer 0, 92, includes five vertices represented by circles. Layer 1, 94, includes a binary list 96 and four vertices 98, represented by X's. In the binary list, a "0" is stored if the corresponding vertex is from Layer 0 and a "1" is stored if the vertex is from Layer 1. A decoder first recovers the order of Layer 0 by following the natural encoding order of the vertices in that layer. Then, if needed, the decoder may recover the order for the first two layers by reading the binary list stored at the beginning of Layer 1. When a "0" is encountered from the list, the decoder places a vertex sequentially from Layer 0 into the corresponding position. When a "1" is encountered, the decoder places a vertex sequentially from Layer 1 which is encoded after the order list. The complete order of all the vertices from Layers 0 and 1 is then recovered and those vertices may be sorted into an array.

If Layer 2, 100, is needed, the decoder may read the order list, 102, stored at the beginning of that layer. When a "0" is read, the decoder places a vertex sequentially from the sorted array containing all vertices from Layer 0 and 1. When a "1" is read, the decoder places a vertex sequentially from Layer 2, represented by triangles, 104. This will then restore the order of all the vertices in Layers 0, 1 and 2. The above process may continue if more layers are available and needed.

The binary ordering lists and the vertex positions may be efficiently encoded using various methods. For instance, the binary ordering list may be encoded using run-length encoding, and the position of vertices at Layer m may be predictively encoded with reference to positions of vertices from Layer m, m−1, . . . , 1, 0.

The Second Embodiment

Referring now to FIG. 7, assume there are M layers of vertices and there are $N_0, N_1, \ldots, N_{(M-1)}$ vertices in Layers 0, 1, . . . , and (M−1), respectively. This embodiment stores the vertex order information for each vertex by recording the numbers of vertices from the previous layers that are between the current vertex and its preceding vertex in the same layer. At the beginning of Layer m, 0<m≦(M−1), $N_m*m$ numbers are recorded, which are the numbers of the vertices from Layer 0, . . . , (m−1), located between a vertex and its preceding vertex in Layer m. For the first vertex in Layer m, the corresponding numbers are the numbers of vertices in Layer 0, . . . , (m−1) located before that vertex. A base layer 106 contains $N_0$ vertices, represented by circles. information, represented by $N_m*m$ numbers, 108, $P_{00} \ldots P_{0m-1} \ldots P_{10} \ldots P_{1m-1} \ldots$ Referring now to FIG. 8, a vertex list 112 contains a listing of vertices for three layers. Layer 0, 114, includes five vertices represented by circles. At the beginning of Layer 1, 116, $N_1*1=4$ numbers, 118, are recorded, which are the numbers of the vertices in Layer 0 located between a vertex and its preceding vertex in Layer 1. Vertices in layer 1, 120, are represented by X's. For the first vertex in Layer 1, the corresponding number is the number of vertices in Layer 0 before that vertex. A decoder first recovers the order of Layer 0 by following the natural encoding order of the vertices in that layer. Then, if needed, the decoder may recover the order for the first two layers by reading the vertex information of Layer 0 stored at the beginning of Layer 1. More specifically, the decoder inserts the recorded number of vertices sequentially from Layer 0 before each vertex from Layer 1. The complete order of all the vertices from Layers 0 and 1 is then recovered and those vertices may be sorted into an array.

If Layer 2, 122, is needed, the decode may read the vertex information, 124, of Layer 0 and 1 stored at the beginning of Layer 2. Vertices in Layer 2 are represented by triangles, 126. The decoder inserts the recorded number of vertices sequentially from the sorted array of Layers 0 and 1 before each vertex in Layer 2. This will then restore the order of all the vertices in Layers 0, 1 and 2. The above process may continue if more layers are available and needed.

As before, the ordering list and vertex positions may be efficiently encoded using various methods. For instance, the binary ordering list may be encoded using run-length encoding, and the position of vertices at Layer m may be predictively encoded with reference to positions of vertices from Layer m, m−1, . . . , 1, 0.

The Third Embodiment

Referring now to FIG. 9, assume there are M layers of vertices and there are $N_0, N_1, \ldots N_{(M-1)}$ vertices in Layers 0, 1, . . . , and (M−1), respectively. This embodiment stores the vertex order information by recording the child vertex information of each vertex in each layer, except the final layer, i.e., Layer (M−1). At the beginning of Layer m, 0<m≦(M−1), $(N_0+ \ldots +N_{(m-1)})$ numbers are recorded which are the numbers of the child vertices in Layer m belonging to each vertex in each of the previous m layers. Base layer 0, 128, contains $N_o$ vertices, represented by circles. Layer m, 130, contains $N_m$ vertices, represented by triangles, and is preceded by child vertex information 132, which contains $N_0+N_1+, \ldots +N_{(M-1)}$ numbers, which are $C_{00} \ldots C_{(No-1)}$ $C_{01}, \ldots C_{(N1-1)}1 \ldots$ For each vertex, its child vertex information is a series of numbers, each of which is the number of its child vertices in one of the successive layers.

Referring now to FIG. 10, a vertex list for three layers of vertices is shown at 134. Base layer 0, 136, includes five vertices, represented by circles. At the beginning of Layer 1, 138, $N_0=5$ numbers, 140, are recorded, which are the numbers of the child vertices (represented by X's, 142) in Layer 1 belonging to each of the $N_0$ vertices in Layer 0. A decoder first recovers the order of Layer 0 by following the natural encoding order of the vertices in that layer. Then, if needed, the decoder may recover the order for the first two layers by reading the related child vertex information of Layer 0 stored at the beginning of Layer 1. More specifically, the decoder inserts the recorded number of vertices sequentially from Layer 1 after each vertex from Layer 0. The complete order of all the vertices from Layers 0 and 1 is then recovered and those vertices may be sorted into an array.

If Layer 2 144 is needed, the decoder may read the child vertex information 146 stored at the beginning of that layer. The decoder inserts the recorded number of vertices, triangles 148, sequentially from Layer 2 after each vertex in Layer 0 and Layer 1. This will then restore the order of all the vertices in Layer 0, 1 and 2. The above process may continue if more layers are available and needed.

As before, the ordering information and vertex positions may be efficiently encoded using various methods. For instance, the binary ordering list may be encoded using run-length encoding, and the position of vertices at Layer m may be predictively encoded in with reference to positions of vertices from Layer m, m−1, . . . , 1, 0.

The Fourth Embodiment

Assume there are M layers of vertices and there are $N_0, N_1, \ldots, N_{(M-1)}$ vertices in Layers 0, 1, . . . , and (M−1), respectively. This variation stores the vertex order information by recording the layer number of the following vertex for each vertex in all the layers. At the beginning of Layer 1, $N_0$ numbers are recorded which are the layer numbers of the vertices following each of the $N_0$ vertices in Layer 0. At the beginning of Layer m, 0<m≦(M−1), $N_{(m-1)}$ numbers are recorded which are the layer numbers of the vertices following each of the $N_{(m-1)}$ vertices in Layer (m−1). A decoder first recovers the order of Layer 0 by following the natural encoding order of the vertices in that layer. Then, if needed, the decoder may recover the order for all the M layers by reading the layer number information stored at the beginning of Layer 1. The decoder starts by removing the first vertex from Layer 0, call it $V_{(0, 0)}$, and putting it into a global order list. It then reads the layer number of the vertex that follows $V_{(0, 0)}$. If that layer number is k, the decoder removes one vertex from Layer k, call it $V_{(k, 0)}$ and places it to the global order list. The decoder then reads the layer number of the vertex which follows $V_{(k, 0)}$ and repeat the above process until all the vertices from all the layers are placed into the global order list. The complete order of all the vertices are therefore restored.

As before, the ordering information and vertex positions may be efficiently encoded using various methods. For instance, the binary ordering list may be encoded using run-length encoding, and the position of vertices at Layer m may be predictively encoded with reference to positions of vertices from Layer m, m−1, . . . , 1, 0.

Operation

The disclosed methods may be implemented in a bit stream scaleable, object-based image and video coding framework in various ways. The following is an example syntax for bit stream scaleable, multiple layer shape coding that extends the non-scaleable vertex-based shape coding method that is currently under consideration in MPEG-4, International Organisation for Standardization, "*Core Experiments on MPEG-4 Video Shape Coding*," Document ISO/IEC JTC1/SC29/WG11N1382, November 1996. The following syntax implements the method of the first embodiment. It should be noted that the current non-scaleable syntax may be extended to implement bit stream scaleable, multiple layer shape coding in different ways using the methods of embodiments 1, 2, 3 or 4.

Semantics hierarchical_vertex_representation: This flag indicates whether the vertices are coded in a hierarchical way to provide scalability. If this flag is "1", then the hierarchical representation will be used for the vertices. Otherwise, the non-hierarchical representation will be used for the vertices.

number_of_vertex_layers: This code indicates the number of layers in the hierarchical representation of the vertices for the current VOP. The number of vertex layers is equal to the value of this 2-bit code+1.

number_of_all_vertices: This variable represents the total number of vertices in all layers. It is available and used only in the encoder.

layer number_of_vertex(i): This variable indicates the vertex layer id of vertex i.

Syntax

The extended syntax which supports scaleable shape coding with separate bit streams is listed as follows for the MPEG-4 standard. Such syntax will change for other MPEG standards.

TABLE 1 shape_coding() syntax

```
shape_coding() {
  if (video_object_layer_shape != '00') {
    shape_saac_on                                           1   bslbf
    if (shape_saac_on == '1') reconstruct_shape_error       1   bslbf
    hierarchical_vertex_representation                      1   bslbf
    if (VOP_prediction_type == '00') intra_shape_
      coding()
    else if (VOP_prediction_type == '01'
  inter_shape_coding()
  }
  eise if (video_object_layer_shape == '10') {
    do {
      gray_shape_coding()
    } while (macroblock count != total_macroblock_count)
  }
}
```

TABLE 2 intra_shape_coding() syntax

```
intra_shape_coding() {
  number_of_contours                                    3m, m>0   uimsbf
  initial_vertex_coding()
  if (!hierarchical_vertex_representation) {
    for (c=0; c < number_of_contours; c++){
      contour_type                                      1–2       vlclbf
      contour_coding_mode                               2         uimsbf
      if (contour_coding_mode == '00')
        polygon_coding()
      else if (contour_coding_mode == '01')
  all_chain_coding()
      else if (contour_coding_mode == '10')
  boundary_chain_coding ()
    }
  }
  else {
    number_of_vertex_layers                             2         uimsbf
    for (h=0; h < number_of_vertex_layers;
      h++) {
      for (c=0; c < number_of_contours; c++){
        if (h ==0) contour_type                         1–2       vlclbf
        else hierarchical_vertex_order_coding(h)
        hierarchical_polygon_coding(h)
      }
    }
  }
}
```

TABLE 3 hierarchical_vertex_order_coding() syntax

```
hierarchical_vertex_order_coding(h) {
  for (i=0, i < number_of_all_vertices; i++) {
    if (layer_number_of_vertex(i) < h) '0'             1   'bslbf
    else if (layer_number_of_vertex(i) == h) '1'       1   bslbf
  }
}
```

TABLE 4 hierarchical_polygon_coding() syntax

```
hierarchica1_polygon_coding (h) {
  polygon_degenerate_mode                              1     bslbf
  if (polygon_degenerate_mode == '1')
    if (h == 0) number_of_vertices                     2     uimsbf
  else {
    no_vert_coding_mode                                1     bslbf
    if (no_vert_coding_mode == '0') number_of_         3m    uimsbf
      vertices
    else number_of_vertices                            8m    uimsbf
    major_diff_range_indicator                         4     uimsbf
    minor_range_indicator                              3     uimsbf
    x_range_indicator   ceil(major_range_indicator-          uimsbf
                            inor_range_indicator+2)
    y_range_indicator   ceil(major_range_indicator-          uimsbf
                            inor_range_indicator+2)
  }                                                          uimsbf
  for (i=1; i < number_of_vertices(h); i++) {
    differential_octant                                      vlclbf
    relative_address_major_component                         vlclbf
    relative_address_minor_component                         vlclbf
  }
}
```

Thus, a method of coding multiple layer, vertex-based shape representation has been disclosed, which includes four variations of one of the steps of the invention. Although a number of variations of the invention have been disclosed, it will be appreciated that further variations and modifications may be made to the method of the invention without departing from the scope of the invention as defined in the appended claims.

What is claimed is:

1. A method of scalable coding and decoding multiple layer, vertex-based shape representation of an image object, comprising:

selecting vertices for the image object in a hierarchical scheme;
   defining multiple layers of vertices;
   arranging M layers of vertices in order, from the most salient layer to the least salient layer;
   placing vertices in their natural order along their image contour within each layer;
   coding vertex order information;
   storing vertex information from each layer separately;
   recording vertex order information for each vertex in each layer of vertices;
   reading vertex information from the most salient layer;
   reading vertex order information and vertex information from the next most salient layer; and
   ordering vertices from multiple layers according to the vertex order information.

2. The method of claim 1 wherein said recording includes recording vertex order information for each vertex by recording a binary vertex order list at the beginning of each layer beginning with layer 1, wherein a "0" is recorded if the corresponding vertex is from the previous layer, and wherein a "1" is recorded if the vertex is from the current layer.

3. The method of claim 1 wherein said recording includes recording vertex order information for each vertex by recording the number of vertices from all previous more salient layers that are between the current vertex and the preceeding vertex in the same layer.

4. The method of claim 1 wherein said recording includes recording the child vertex information for each vertex in each layer for layer 0 through layer M−2.

5. The method of claim 1 wherein said recording includes recording the layer number of the following vertex for each vertex in all of the layers.

6. The method of claim 1 which includes transmitting the vertex information and the vertex order information from a first location to a second location.

7. The method of claim 1 which includes storing the vertex information and the vertex order information at a first point in time and decoding the vertex information and vertex order information at a second point in time.

* * * * *